US012449808B2

(12) United States Patent
Lu et al.

(10) Patent No.: US 12,449,808 B2
(45) Date of Patent: Oct. 21, 2025

(54) UNMANNED AERIAL VEHICLE, CONTROL METHOD AND DEVICE THEREOF, CONTROL TERMINAL, AND STORAGE MEDIUM

(71) Applicant: SZ DJI TECHNOLOGY CO., LTD., Shenzhen (CN)

(72) Inventors: Chengfu Lu, Shenzhen (CN); Shi Chen, Shenzhen (CN); Xiaobin Yan, Shenzhen (CN); Jun Jing, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 238 days.

(21) Appl. No.: 18/341,285

(22) Filed: Jun. 26, 2023

(65) Prior Publication Data
US 2023/0359201 A1 Nov. 9, 2023

Related U.S. Application Data

(63) Continuation of application No. PCT/CN2020/141068, filed on Dec. 29, 2020.

(51) Int. Cl.
*G05D 1/00* (2024.01)

(52) U.S. Cl.
CPC ......... *G05D 1/0061* (2013.01); *G05D 1/0016* (2013.01); *B64U 2201/20* (2023.01)

(58) Field of Classification Search
CPC .............. G05D 1/0061; G05D 1/0016; B64U 2201/20; B64C 39/024
See application file for complete search history.

(56) References Cited

U.S. PATENT DOCUMENTS

2011/0288696 A1* 11/2011 Lefebure ............... A63H 27/12
701/2
2016/0340867 A1* 11/2016 Matsuzaki ........... A01B 69/008
(Continued)

FOREIGN PATENT DOCUMENTS

CN   201361453 Y   12/2009
CN   102068823 A    5/2011
(Continued)

OTHER PUBLICATIONS

Machine translation for CN11708379A, Sep. 25, 2020, Wang Guanilin.*
(Continued)

*Primary Examiner* — Abdalla A Khaled
(74) *Attorney, Agent, or Firm* — ANOVA LAW GROUP, PLLC

(57) ABSTRACT

A control method includes in response to a mode switch operation of a user, switching to a first control mode or a second control mode, in response to a position adjustment of an operation member of a control terminal, adjusting a position or an attitude of an aerial vehicle in a control direction corresponding to the operation member, in the first control mode, in response to the operation member being at a preset first initial position, controlling the aerial vehicle to maintain the position or the attitude unchanged in the control direction, and in the second control mode, in response to the aerial vehicle being in an initial status in the control direction and the operation member being in a preset second initial position different from the first initial position, controlling the aerial vehicle to maintain the position or the attitude unchanged in the control direction.

19 Claims, 7 Drawing Sheets

(56) References Cited

U.S. PATENT DOCUMENTS

| | | | |
|---|---|---|---|
| 2017/0236210 A1* | 8/2017 | Kumar | B60W 60/0059 |
| | | | 705/4 |
| 2017/0315556 A1* | 11/2017 | Mimura | G05D 1/0061 |
| 2017/0329325 A1* | 11/2017 | Hong | G05D 1/0044 |
| 2018/0095492 A1* | 4/2018 | Matloff | A63H 27/12 |
| 2020/0310414 A1* | 10/2020 | Torii | H04Q 9/00 |
| 2020/0363199 A1* | 11/2020 | Jensen | G01S 19/42 |
| 2021/0024099 A1* | 1/2021 | Ito | G05D 1/0022 |
| 2021/0084224 A1* | 3/2021 | Wang | F16M 11/123 |
| 2021/0195496 A1* | 6/2021 | Hong | G05D 1/0022 |
| 2021/0216068 A1* | 7/2021 | Mo | G05D 1/101 |
| 2021/0302958 A1* | 9/2021 | Tschanz | G05D 1/0061 |
| 2022/0055747 A1* | 2/2022 | Zhao | G01S 19/45 |
| 2022/0250745 A1* | 8/2022 | Suvorov | H04W 4/38 |
| 2023/0303373 A1* | 9/2023 | Chiu | G05D 1/0061 |

FOREIGN PATENT DOCUMENTS

| | | | |
|---|---|---|---|
| CN | 202844581 U | | 4/2013 |
| CN | 103157288 A | * | 6/2013 |
| CN | 105517656 A | | 4/2016 |
| CN | 105599894 A | | 5/2016 |
| CN | 105944386 A | | 9/2016 |
| CN | 106809386 A | | 6/2017 |
| CN | 106940564 A | | 7/2017 |
| CN | 108663929 A | | 10/2018 |
| CN | 208953965 U | | 6/2019 |
| CN | 111708379 A | * | 9/2020 |

OTHER PUBLICATIONS

Machine translation for CN103157A, Jun. 19, 2013, Deng Lidan.*
The World Intellectual Property Organization (WIPO) International Search Report for PCT/CN2020/141068 Sep. 28, 2021 5 pages (including English translation).

* cited by examiner

UNMANNED AERIAL VEHICLE, CONTROL METHOD AND DEVICE THEREOF, CONTROL TERMINAL, AND STORAGE MEDIUM

CROSS-REFERENCE TO RELATED APPLICATION

This application is a continuation of International Application No. PCT/CN2020/141068, filed Dec. 29, 2020, the entire content of which is incorporated herein by reference.

TECHNICAL FIELD

The present disclosure relates to the unmanned aerial vehicle technology field and, more particularly, to an unmanned aerial vehicle (UAV), a control method and device of a UAV, a control terminal, and a storage medium.

BACKGROUND

Unmanned aerial vehicles (UAVs) are widely used as consumer UAVs and industrial UAVs. At present, a user mainly controls a UAV to complete a series of actions through an operation member of a control terminal. As the number of UAV users continues to increase, higher requirements of flight experience, flight safety, and control convenience are imposed on the UAVs by more professional users. Thus, a control strategy, with which the UAV is safer and more convenient to operate, and the flight experience is better, is needed.

SUMMARY

In accordance with the disclosure, there is provided a control method. The method includes in response to a mode switch operation of a user, switching to a first control mode or a second control mode, in response to a position adjustment of an operation member of a control terminal, adjusting a position or an attitude of an aerial vehicle in a control direction corresponding to the operation member, in the first control mode, in response to the operation member being at a preset first initial position, controlling the aerial vehicle to maintain the position or the attitude unchanged in the control direction, and in the second control mode, and in response to the aerial vehicle being in an initial status in the control direction and the operation member being in a preset second initial position different from the first initial position, controlling the aerial vehicle to maintain the position or the attitude unchanged in the control direction. In the second control mode, the operation member is in a non-centering status and is not able to return to the first initial position automatically.

Also in accordance with the disclosure, there is provided a control terminal including one or more processors and one or more memories. The one or more memories store instructions that, when executed by the one or more processors, causes the one or more processors to in response to a mode switch operation of a user, switch to a first control mode or a second control mode, in response to a position adjustment of an operation member of a control terminal, adjust a position or an attitude of an aerial vehicle in a control direction corresponding to the operation member, in the first control mode, in response to the operation member being at a preset first initial position, control the aerial vehicle to maintain the position or the attitude unchanged in the control direction, and in the second control mode, and in response to the aerial vehicle being in an initial status in the control direction and the operation member being in a preset second initial position different from the first initial position, control the aerial vehicle to maintain the position or the attitude unchanged in the control direction. In the second control mode, the operation member is in a non-centering status and is not able to return to the first initial position automatically.

Also in accordance with the disclosure, there is provided an aerial vehicle, including a body, a power system, one or more processors, and one or more memories. The power system is arranged at the body and configured to provide flight power to the aerial vehicle. The one or more memories store instructions that, when executed by the one or more processors, causes the one or more processors to in response to a mode switch operation of a user, switch to a first control mode or a second control mode, in response to a position adjustment of an operation member of a control terminal, adjust a position or an attitude of an aerial vehicle in a control direction corresponding to the operation member, in the first control mode, in response to the operation member being at a preset first initial position, control the aerial vehicle to maintain the position or the attitude unchanged in the control direction, and in the second control mode, and in response to the aerial vehicle being in an initial status in the control direction and the operation member being in a preset second initial position different from the first initial position, control the aerial vehicle to maintain the position or the attitude unchanged in the control direction. In the second control mode, the operation member is in a non-centering status and is not able to return to the first initial position automatically.

DETAILED DESCRIPTION OF THE EMBODIMENTS

Embodiments of the present disclosure are described in detail in connection with the accompanying drawings of embodiments of the present disclosure. Embodiments of the present disclosure are some embodiments of the present disclosure, not all embodiments. Based on embodiments of the present disclosure, all other embodiments obtained by those of ordinary skill in the art without creative efforts are within the scope of the present disclosure.

The flowcharts shown in the accompanying drawings are for illustration only, do not necessarily include all contents and operations/steps, and do not need to be performed in the order described. For example, some operations/steps can also be divided, combined, or partially combined. Thus, an actual execution order can be changed according to the actual situation.

Some embodiments of the present disclosure are described in detail below in connection with the accompanying drawings. When there is no conflict, embodiments and features of the embodiments can be combined with each other.

Figure 1:
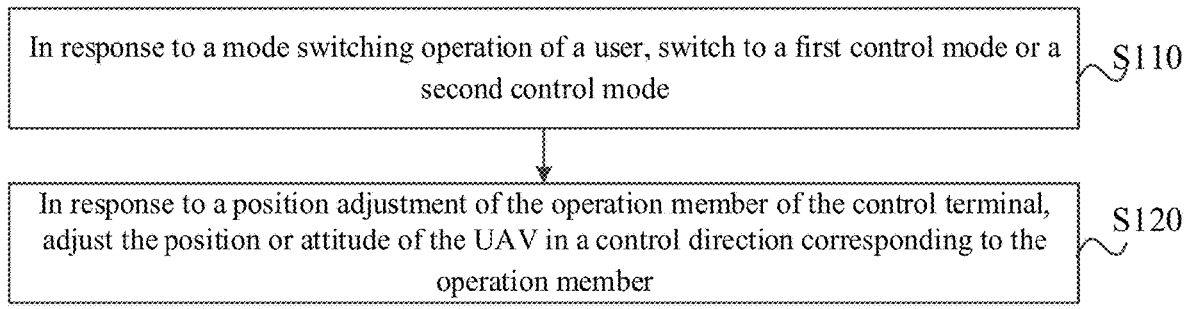
FIG. 1 is a schematic flowchart of a control method of an unmanned aerial vehicle (UAV) consistent with an embodiment of the present disclosure.

FIG. 1 is a schematic flowchart of a control method of an unmanned aerial vehicle (UAV) consistent with an embodiment of the present disclosure. The control method can be applied to a control terminal or the UAV and used to control the UAV to perform a preset task to adjust a position and/or an attitude.

Figure 2:
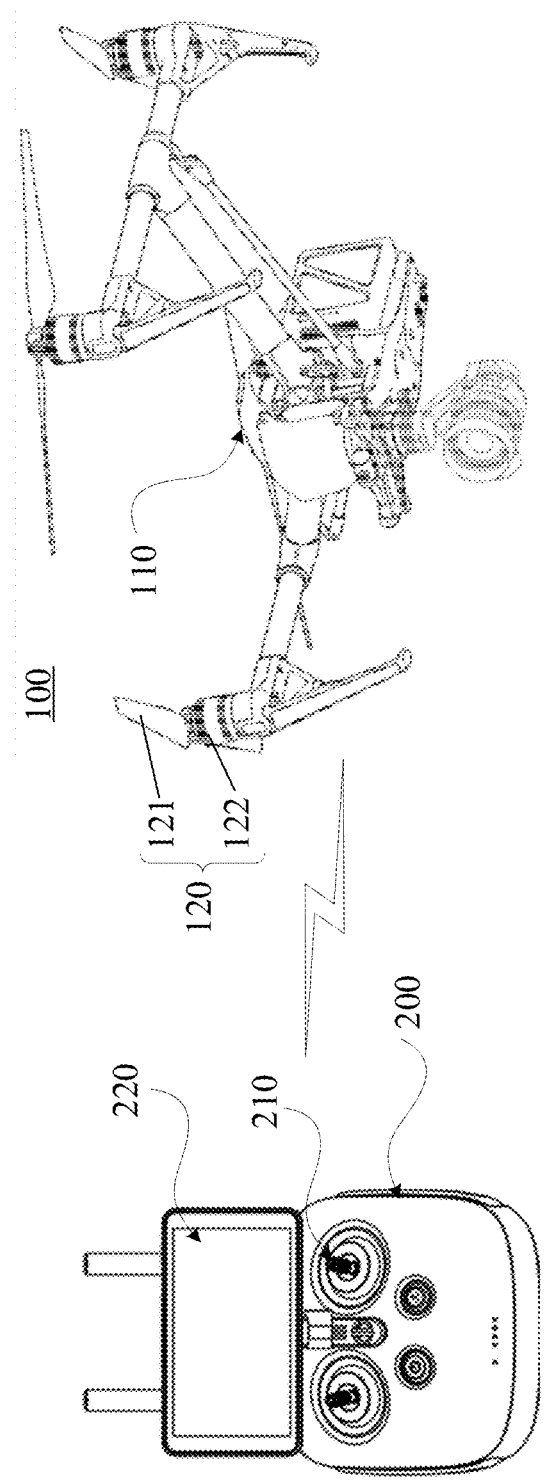
FIG. 2 is a schematic diagram showing an application scenario of a control method of a UAV consistent with an embodiment of the present disclosure.

FIG. 2 is a schematic diagram showing an application scenario of the control method of the UAV 100 consistent with an embodiment of the present disclosure. As shown in FIG. 2, the scenario includes the UAV 100 and a control terminal 200. The UAV 100 is communicatively connected to the control terminal 200. The control terminal 200 can be configured to control the UAV 100.

The UAV 100 includes a body 110 and a power system 120 arranged at the body 100. The power system 120 includes one or more propellers 121, one or more motors 122 corresponding to the one or more propellers 121, and one or more electronic speed controls (ESCs). A motor 122 is connected between an ESC and a propeller 121. The motor 122 and the propeller 121 are arranged at the body 110 of the UAV 100. An ESC can be configured to receive a driving signal generated by a control system and provide a driving current to the motor 122 according to the driving signal to control a rotation speed of the motor 122. The motor 122 can be configured to drive the propeller 121 to rotate to provide power for the UAV 100 to fly. The power can cause the UAV 100 to move in one or more degrees of freedom. In some embodiments, the aerial vehicle 100 can rotate around one or more rotation axes. For example, the above rotation axes can include a roll axis, a yaw axis, and a pitch axis. The motor 122 can include a DC motor or an AC motor. In addition, the motor 122 can include a brushless motor or a brushed motor.

The aerial vehicle 100 can further include a controller and a sensor system (not shown in FIG. 2). The sensor system can be configured to measure the attitude information of the aerial vehicle, that is, position information and status information of the aerial vehicle 100 in space, for example, a 3D position, a 3D angle, a 3D velocity, a 3D acceleration, a 3D angular velocity, etc. For example, the sensor system can include at least one of a gyroscope, an ultrasonic sensor, an electronic compass, an inertial measurement unit (IMU), a visual sensor, a global navigation satellite system, or a barometer. For example, the global navigation satellite system can include the global positioning system (GPS). The controller can be configured to control the movement of the UAV 100. For example, the movement of the UAV 100 can be controlled according to the attitude information measured by the sensor system. The controller can be configured to control the UAV 100 according to a pre-programmed instruction.

The control terminal 200 can include a physical operation member 210. The operation member 210 can be configured to control the UAV 100 to fly in a horizontal direction, turn, roll, or fly in a vertical direction. The operation member 210 can include a physical joystick, a physical wheel, a physical button, etc.

In some embodiments, the control terminal 200 further includes a display device 220. The display device 220 can include a virtual operation member 210. For example, the operation member 210 can also include a virtual joystick, a sliding bar, a virtual button, and a virtual wheel on the display device 220.

One or more operation members 210 can be included. For example, the one or more operation members 210 can be configured to control the UAV 100 to fly in the horizontal direction, turn, roll, and fly in the vertical direction.

The control terminal 200 can include at least one of a remote controller, a ground control platform, a cell phone, a tablet computer, a notebook computer, or a personal computer. The UAV 100 can include a rotor-type UAV, e.g., a quad-rotor UAV, a hexa-rotor UAV, an octa-rotor UAV, a fixed-wing UAV, or a combination of the rotor-type UAV and the fixed-wing UAV, which is not limited here. In some embodiments, the UAV 100 can be used as an aerial photography UAV and a traversing UAV, for example, an experience machine.

The control method of the UAV of embodiments of the present disclosure is described in detail in connection with the scenario in FIG. 2. The scenario in FIG. 2 is only used to explain the control method of the UAV of embodiments of the present disclosure but not to limit the application scenario of the control method of the UAV of embodiments of the present disclosure.

As shown in FIG. 1, the control method of the UAV of embodiments of the present disclosure includes processes S110 and S120.

At S110, in response to a mode switch operation of a user, a control mode of the UAV is switched to a first control mode or a second control mode.

In some embodiments, the control terminal can further include a control member. The control member can be configured to set a control mode of the UAV. For example, the control mode of the UAV can include a first control mode and a second control mode. The control member can include a physical button, a physical sliding key, a virtual button, or a virtual sliding key, which is not limited by embodiments of the present disclosure.

In some embodiments, the mode switch operation can include a trigger operation of the user on the control member. In response to the trigger operation of the user on the control member, the control mode can be set to the first control mode or the second control mode. For example, when the control mode is the first control mode, the control mode can be set to the second control mode in response to the trigger operation of the user on the control member. On the contrary, when the control mode is the second control mode, the control mode can be set to the first control mode in response to the trigger operation of the user on the control member. The trigger operation can include a single-click operation, a double-click operation, or a long-press operation. The user can quickly switch the control mode through the control member to improve user experience. In some other embodiments, for example, the control mode can be switched to different control modes through different trigger operations, which facilitates the user to quickly switch the control mode to improve the user experience.

In some embodiments, in the first control mode, the operation member can be configured to control a moving speed and/or an attitude angle of the UAV. In some embodiments, the first control mode can be referred to as an angle mode or an aerial photography mode.

In some embodiments, in the second control mode, the operation member can be configured to control an acceleration and/or an angular velocity of attitude adjustment of the UAV. In some embodiments, the second control mode can be referred to as a traversing mode or a manual (Acro) mode.

At S120, in response to a position adjustment of the operation member of the control terminal, the position or attitude of the UAV is adjusted in a control direction corresponding to the operation member.

In some embodiments, the control terminal can include the operation member. The operation member can be configured to control the position or attitude of the UAV in a corresponding control direction. The operation member can include a physical operation member and/or a virtual operation member. In some embodiments, the control terminal can include a human-computer interaction interface. The human-computer interaction interface can include several operation members. In some embodiments, the operation member can include at least one of a physical joystick, a physical wheel, a physical button, a virtual joystick, a sliding bar, a virtual button, or a virtual wheel.

In some embodiments, the control direction corresponding to the operation member can include at least one of an up-down direction, a front-rear direction, a left-right direction, a yaw direction, a roll direction, or a pitch direction. Different operation members can be configured to control the UAV to adjust a flight status in different directions.

In some embodiments, a left joystick of the remote controller can be configured to control the movement of the UAV in the horizontal direction, e.g., the movement in the front-rear direction and/or the movement in the left-right direction. A right joystick of the remote controller can be configured to control ascending and descending of the UAV in the up-down direction and/or the yaw direction of the UAV. Thus, the UAV can rotate clockwise or counterclockwise at an original position. This operation mode can be referred to as a Chinese manual operation mode.

In some embodiments, an American manual operation mode can be also supported. The left joystick of the remote controller can be configured to control the ascending and descending and/or clockwise/counterclockwise rotation of the UAV. The right joystick of the remote controller can be configured to control the front-rear movement and/or left-right movement of the UAV in the horizontal direction. In some embodiments, a Japanese manual operation mode can also be supported. The left joystick of the remote controller can be configured to control the front-rear movement in the front-rear direction and/or the clockwise and counterclockwise rotation. The right joystick of the remote controller can be configured to control the ascending and descending of the UAV and/or the left-right movement in the left-right movement in the left-right direction.

In some embodiments, the control direction corresponding to the operation member can be determined according to the current operation mode of the control terminal. In some embodiments, the current operation mode can be determined according to the mode switch operation of the user on the control terminal, e.g., the Chinese manual operation mode. The control directions corresponding to the operation members can be determined according to the operation mode.

In some embodiments, in the first control mode, the operation member can be configured to control the moving speed and/or the attitude angle of the UAV.

In some embodiments, in the first control mode, in response to the position adjustment of the operation member of the control terminal, a target moving speed in the up-down direction, the front-rear direction, or the left-right direction of the UAV can be adjusted, or a target attitude angle in the yaw direction, the roll direction, or the pitch direction of the UAV can be adjusted. For example, in response to the position adjustment of the operation member of the control terminal, the target moving speed of the UAV can be adjusted in the up-down direction.

In some embodiments, if the control mode is the first control mode, the target moving speed or the target attitude angle of the UAV can be determined according to an adjustment amplitude of the position adjustment of the operation member. The UAV can be controlled to fly according to the target moving speed or adjust the attitude according to the target attitude angle. In the first control mode, different amplitudes of the position adjustment can be mapped to different target moving speeds or target attitude angles. Thus, the user can be facilitated to operate the UAV more safely in a scenario with a relatively small moving speed during taking off and landing. Thus, the control convenience and user experience can be improved.

In some embodiments, the amplitude of the position adjustment of the operation member can include the amplitude deviated from the initial position when the user triggers the operation member to move in a corresponding direction.

In some embodiments, the amplitude that the user triggers the operation member to deviate from the initial position in the first direction can be referred to as a position adjustment amplitude of the first direction. The amplitude that the user triggers the operation member to deviate from the initial position in the second direction can be referred to as a position adjustment amplitude of the second direction.

In some embodiments, the amplitude of the position adjustment in the first control mode can include the amplitude of the operation member deviating from the first initial position.

In some embodiments, the first initial position can be located in the middle of the movement stroke of the operation member. In some embodiments, the first initial position can include a middle position of the movement stroke of the operation member.

In the first control mode, the target moving speed or target attitude angle of the UAV can be determined in a direction according to the position adjustment amplitude of the first direction, e.g., a forward moving speed. The target moving speed or target attitude angle of the UAV can be determined in another direction according to the position adjustment amplitude of the second direction. When the second direction is opposite to the first direction, the moving speed in the other direction can include a backward moving speed.

In some embodiments, in the first control mode, the target moving speed or target attitude angle of the UAV can be positively correlated with the amplitude of the position adjustment of the operation member. For example, the positive correlation between the target moving speed or target attitude angle of the UAV and the amplitude of the position adjustment of the operation member can include a linear positive correlation or a nonlinear positive correlation. Since the target moving speed or target attitude angle of the UAV is positively correlated with the amplitude of the position adjustment of the operation member, the greater the amplitude of the position adjustment of the operation member is, the larger the target moving speed or target attitude angle of the UAV is, and the smaller the amplitude of the position adjustment is, the smaller the target moving speed or the target attitude angle of the UAV is.

In some embodiments, in the first control mode, when the amplitude of the position adjustment of the operation member is zero, the target moving speed or the target attitude angle of the UAV in the corresponding control direction can be zero.

In some embodiments, in the first control mode, if the operation member is in a preset first initial position, the UAV can be controlled to maintain the position or attitude unchanged in the control direction.

In some embodiments, controlling the UAV to maintain the position or attitude unchanged in the control direction can include determining that the target moving speed of the UAV or the target attitude angle is zero in the control direction.

In some embodiments, if the operation member is in a preset first initial position in the first control mode, such as the middle position, the amplitude of the position adjustment of the operation member can be zero, and the target moving speed or the target attitude angle of the UAV can be zero in the corresponding control direction. Thus, the position and the attitude of the UAV can be unchanged in the control direction.

In some embodiments, in the first control mode, the target moving speed can be less than or equal to a preset upper speed limit, and/or the target attitude angle can be less than or equal to a preset upper angle limit. In the first control mode, the UAV can be limited by a maximum speed and/or attitude angle when flying, which can improve flight safety.

In some embodiments, in the first control mode, if the operation member is in the preset first initial position, the UAV can be controlled to maintain the position or the attitude unchanged in the control direction according to the sensor data of the sensor carried by the UAV.

In some embodiments, the sensor can include at least one of a GPS receiver, an inertial measurement unit, a barometer, or a time-of-flight sensor.

In some embodiments, in the first control mode, if the operation member is in the preset first initial position, the UAV can be controlled to maintain a horizontal attitude according to the sensor data.

In the first control mode, when the operation member is in the preset first initial position, the UAV can control the UAV to maintain the horizontal attitude by relying on the sensor data of the GPS receiver, the inertial measurement unit, the barometer, the sensor data and the sensor fusion algorithm of the time-of-flight sensor. The user may not need to manually correct the attitude of the UAV frequently to achieve self-stable flight. For example, after the user triggers the operation member to deviate from the first initial position in the first direction, the UAV can maintain the position or attitude in the corresponding control direction. When the operation member automatically returns to the first initial position or is triggered by the user to return to the first initial position, the UAV can be controlled to maintain the position or attitude unchanged in the control direction according to the sensor data.

In some embodiments, in the second control mode, the operation member can be configured to control the acceleration and/or the angular speed of the attitude adjustment of the UAV.

In some embodiments, in the second control mode, in response to the position adjustment of the operation member of the control terminal, the target acceleration of the UAV in the up-down direction, the front-rear direction, or the left-right direction, or the target angular speed of the UAV in the yaw direction, the roll direction, or the pitch direction can be adjusted. For example, in response to the position adjustment of an operation member of the control terminal, the target acceleration of the UAV can be adjusted in the up-down direction to facilitate the UAV to take off, ascend, or descend.

In some embodiments, the amplitude of the position adjustment in the second control mode can include the amplitude of the operation member deviating from the preset second initial position. The second initial position of an operation member can be different from the first initial position.

In some embodiments, the first initial position can be located in the middle of the movement stroke of the operation member. The second initial position of the operation member can be located on one of the two sides of the movement stroke of the operation member.

For example, the first initial position can include the middle position of the movement stroke of the operation member. The second initial position of the operation member can include the position of the operation member at one end of the movement stroke.

In some embodiments, the operation member can include an X-axis on a left-hand side of the remote controller (American manual operation mode) and/or the X-axis on the right-hand side (Chinese manual operation mode).

In some embodiments, in the second control mode, the initial position of the operation member can be placed at one end of the movement stroke, e.g., the bottom. The position adjustment of the operation member can be unidirectional. In some embodiments, the operation member can be configured as a throttle of the UAV. When the operation member is in the second initial position, the throttle can be 0, and the acceleration of the UAV in the corresponding control direction can be 0. The operation member can be at the other end of the movement stroke, e.g., the top. The UAV can have a maximum acceleration in the corresponding control direction. For example, the UAV can take off by overcoming the gravity. When the operation member is between one end of the movement stroke and the first initial position, or at the first initial position, or between the first initial position and the other end of the movement stroke, the UAV can overcome the gravity to hover. In some embodiments, when the operation member is at the first initial position, the UAV can hover or be accelerated to ascend.

In some embodiments, the second initial position of the operation member can be the same as the first initial position. For example, the second initial position of the operation member corresponding to the front-rear direction or the left-right direction can also be the middle position of the movement stroke of the operation member.

In some embodiments, if the control mode is the second control mode, the target acceleration or the target angular speed of the UAV can be determined according to the amplitude of the position adjustment of the operation member. The UAV can be controlled to fly according to the target acceleration or adjust the attitude angle according to the target angular speed. In the second control mode, different amplitudes of the position adjustment can be mapped to different target accelerations or target angular speeds. By adjusting the acceleration of the UAV or the angular speed of the position adjustment according to the position adjustment of the operation member, the user can control the UAV independently, e.g., the attitude of the traversing UAV, which can bring the user a faster flying experience and more exciting flying feeling.

In the second control mode, the target acceleration or target angular speed of the UAV in one direction, e.g., the forward acceleration, can be determined according to the amplitude of the position adjustment in the first direction. The target acceleration or target angular speed of the UAV in another direction can be determined according to the amplitude of the position adjustment in the second direction. When the second direction is opposite to the first direction, the moving speed in the another direction can be backwardly accelerated or can be referred to as deceleration.

In some embodiments, in the second control mode, the target acceleration or target angular speed of the UAV can have a positive correlation with the amplitude of the position adjustment of the operation member. For example, the positive correlation between the target acceleration or target angular speed of the UAV and the amplitude of the position adjustment of the operation member can include a linear positive correlation or a nonlinear positive correlation. Since the target acceleration or target angular speed of the UAV has a positive correlation with the amplitude of the position adjustment of the operation member, the greater the amplitude of the position adjustment of the operation member is, the larger the target acceleration or target angular speed of the UAV is, and the smaller the amplitude of the position adjustment is, the smaller the target acceleration or target angular speed of the UAV is.

In the second control mode, the position adjustment of the operation member can cause the acceleration or angular speed of the attitude adjustment of the UAV to change. The user can manually trigger the position adjustment of the operation member to continuously correct the flight status of the UAV.

In some embodiments, in the second control mode, when the amplitude of the position adjustment of the operation member is zero, the target acceleration or target angular speed of the UAV in the corresponding control direction can be zero.

In some embodiments, the UAV can be in a flight status. In the second control mode, when the amplitude of the position adjustment of the operation member corresponding to the front-rear direction or the left-right direction is zero, the UAV can continue to fly in a certain direction. For example, when the position adjustment of the operation member causes the speed of the UAV in one direction to be V, the position of the operation member can be adjusted to the preset middle position. Then, the UAV can continue to move at speed V in the direction.

In some embodiments, in the second control mode, if the UAV is in an initial status in the control direction, and the operation member is in the preset second initial position, the UAV can be controlled to maintain the position or attitude unchanged in the control direction. In some embodiments, the UAV being in the initial status in the control direction can include that the position or attitude of the UAV does not change in the control direction. For example, the UAV can be in a landed status.

In some embodiments, being in the initial status in the control direction can include the landed status. For example, when the UAV is in the landed status, if the operation member corresponding to the up-down direction is in the preset second initial position, the UAV may not have an upward acceleration and thus maintain the landed status.

In some embodiments, controlling the UAV to maintain the position or attitude unchanged in the control direction corresponding to the operation member can include determining that the target acceleration or the target angular speed of the UAV in the control direction is zero.

In some embodiments, in the second control mode, if the UAV is in the initial status in the control direction, e.g., the landed status and the operation member being in the preset second initial position, the amplitude of the position adjustment of the operation member can be zero. The target acceleration or target angular speed of the UAV in the corresponding control direction can be zero. Thus, the UAV can maintain the position or attitude unchanged in the control direction.

In some embodiments, the control direction corresponding to the operation member can be the up-down direction. That is, the operation member can be configured to control the UAV to ascend and descend. By increasing the amplitude of the position adjustment of the operation member deviating from the second initial position, e.g., increasing the throttle, the UAV can overcome the gravity to ascend. By decreasing the amplitude of the position adjustment of the operation member deviating from the second initial position, e.g., decreasing the throttle, the UAV can descend.

In some embodiments, the method can further include, if the UAV is in a flight status, and the corresponding operation member is in a preset second initial position, controlling a descending speed of the UAV to be not greater than a descending threshold.

The UAV usually has a certain altitude from the ground when flying. When the UAV is in the flight status, if the operation member corresponding to the up-down direction is in the preset second initial position, the throttle can be reduced to zero. The UAV can descend under the gravity. In some embodiments, the descending speed of the UAV can be controlled to be not greater than the descending threshold to prevent the descending speed of the UAV from being too large to cause the UAV to crash.

In some embodiments, in the second control mode, the attitude angle of the UAV may not have a display range. For example, the UAV can support a 360° rotation. Thus, the UAV can be more flexibly controlled compared to the first control mode.

In some embodiments, in the second control mode, the UAV may not be controlled to maintain a horizontal attitude in the control direction according to the sensor data of the sensor carried by the UAV. For example, an enabling sensor can be omitted to save computing resources and power. The flight control can be more flexible.

In some embodiments, at least in the second control mode, the operation member can be in a non-centering status. In the non-centering status, the operation member cannot automatically return to the first initial position. For example, the position adjustment of the operation member can be triggered by the user and cannot be adjusted autonomously. For example, when the user adjusts the operation member to a position, the operation member can stay at the position without moving until the user adjusts the operation member to another position.

In some embodiments, the user can perform the mode switch operation to switch to the second control mode. The operation member can automatically return to the first initial position. For example, the operation member can automatically return to the first initial position from the second initial position different from the first initial position. Since the initial positions being different can cause the amplitudes of the position adjustment of the operation member to be different, the range of the position adjustment of the control component is different due to the difference of the initial position, the operation member returning to the first initial position can cause the amplitude of the position adjustment to be not zero. Thus, the UAV can have a non-zero acceleration or angular speed in the control direction corresponding to the operation member, and the UAV can have an unexpected acceleration or angular speed.

For example, the user can pull the operation member defined as the throttle from the middle position of the movement stroke to an end of the movement stroke and switches to the second control mode. When the user releases the operation member, the operation member can return to the middle position from the end automatically to cause the throttle to increase from zero to a throttle value corresponding to the middle position of the movement stroke. Thus, the UAV can fly up abruptly to enter an out-of-control status.

In the second control mode, the operation member can at least be caused to be in the non-centering status. That is, the operation member cannot automatically return to the first initial position. Thus, the UAV can be safely and reliably switched to the second control mode, e.g., a manual mode or a traversing mode. Therefore, safety risks can be eliminated to greatly improve flying safety and enhance flight reliability.

In some embodiments, the method can further include determining whether the operation member is in the centering status or the non-centering status through the detection device of the control terminal. In the centering status, the operation member can return to the first initial position automatically without a user operation.

In some embodiments, when the operation member is in the non-centering status, in response to the mode switch operation of the user, the UAV can be switched to the first control mode or the second control mode. When the operation member is in the non-centering status, the UAV can be switched to the second control mode safely and reliably. Thus, the UAV can be switched to the second control mode according to the mode switch operation of the user. In some embodiments, the UAV can be switched from the second control mode to the first control mode. For example, when the operation member is in the non-centering status, the control mode can be set to the first control mode or the second control mode in response to the trigger operation of the user on the control member of the operation member. The control member can include a physical button, a physical sliding key, a virtual button, and a virtual sliding key, which is not limited by embodiments of the present disclosure.

In some embodiments, the method can further include, when the operation member is in the non-centering status, outputting second prompt information and/or outputting third prompt information. The second prompt information can be used to prompt that the operation member is in the non-centering status. The third prompt information can be used to prompt that the current mode is the first control mode or the second control mode. For example, when the operation member is in the non-centering status, the third prompt information used to prompt that the current mode is the first control mode can be output, and/or the prompt information used to prompt the user that switching to the second control mode is possible can be output. The user can switch to the second control mode through the mode switch operation according to the prompt information.

In some embodiments, when the operation member is in the centering status, the UAV can be switched to the first control mode. Thus, the UAV can be prevented from having the unexpected acceleration or angular speed caused when the operation member automatically returns to the first initial position while the operation member is in the centering status and the UAV is in the second control mode.

In some embodiments, the operation member can be in the centering status. If the mode switch operation of the user is obtained, the first prompt information can be output. The first prompt information can be used to prompt that the operation member is in the centering status and/or the UAV cannot be switched to the second control mode. To facilitate the user to set the operation member in the non-centering status, the operation member can be set in the non-centering status by adjusting the status of the centering device, and the UAV can be switched to the second control mode through the mode switch operation in the non-centering status.

In some embodiments, the prompt information can be output through at least one of a screen, a speaker, or an LED of the control terminal.

In some embodiments, the control terminal can include a remote controller.

Figure 3:
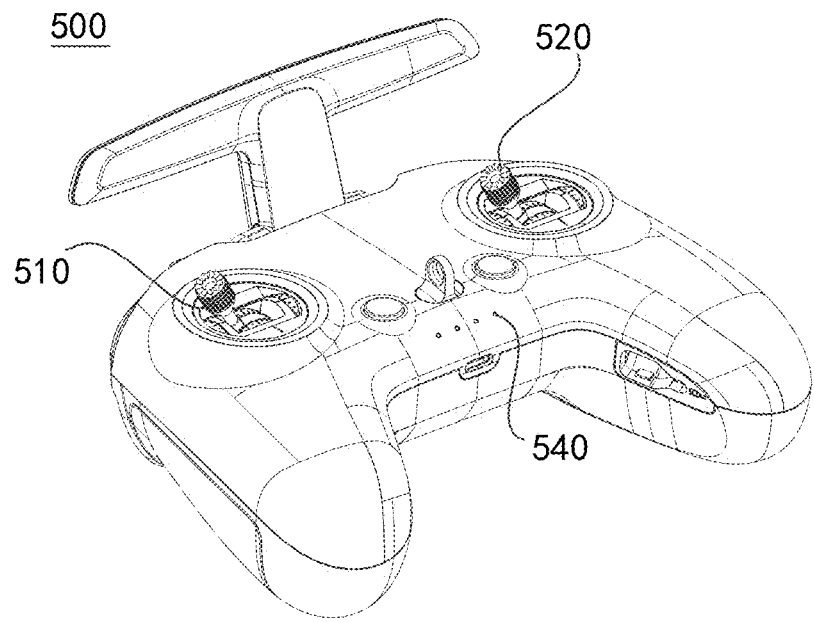
FIG. 3 is a schematic structural diagram of a control terminal from an angle consistent with an embodiment of the present disclosure.
Figure 4:
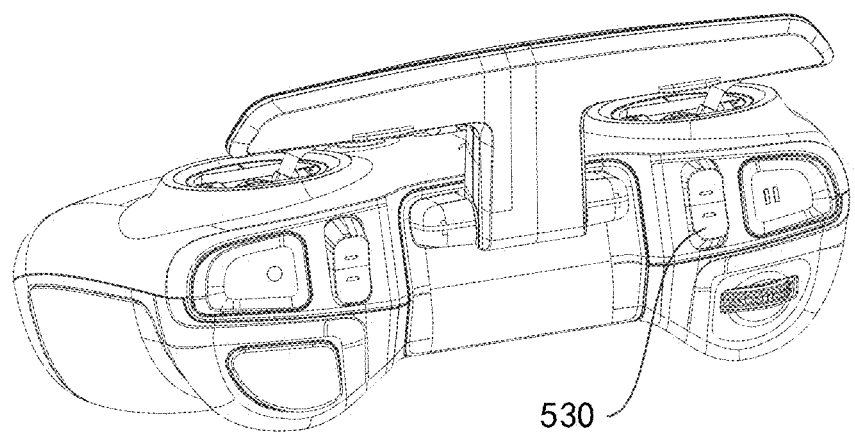
FIG. 4 is a schematic structural diagram of the control terminal in FIG. 3 from another angle.
Figure 5:
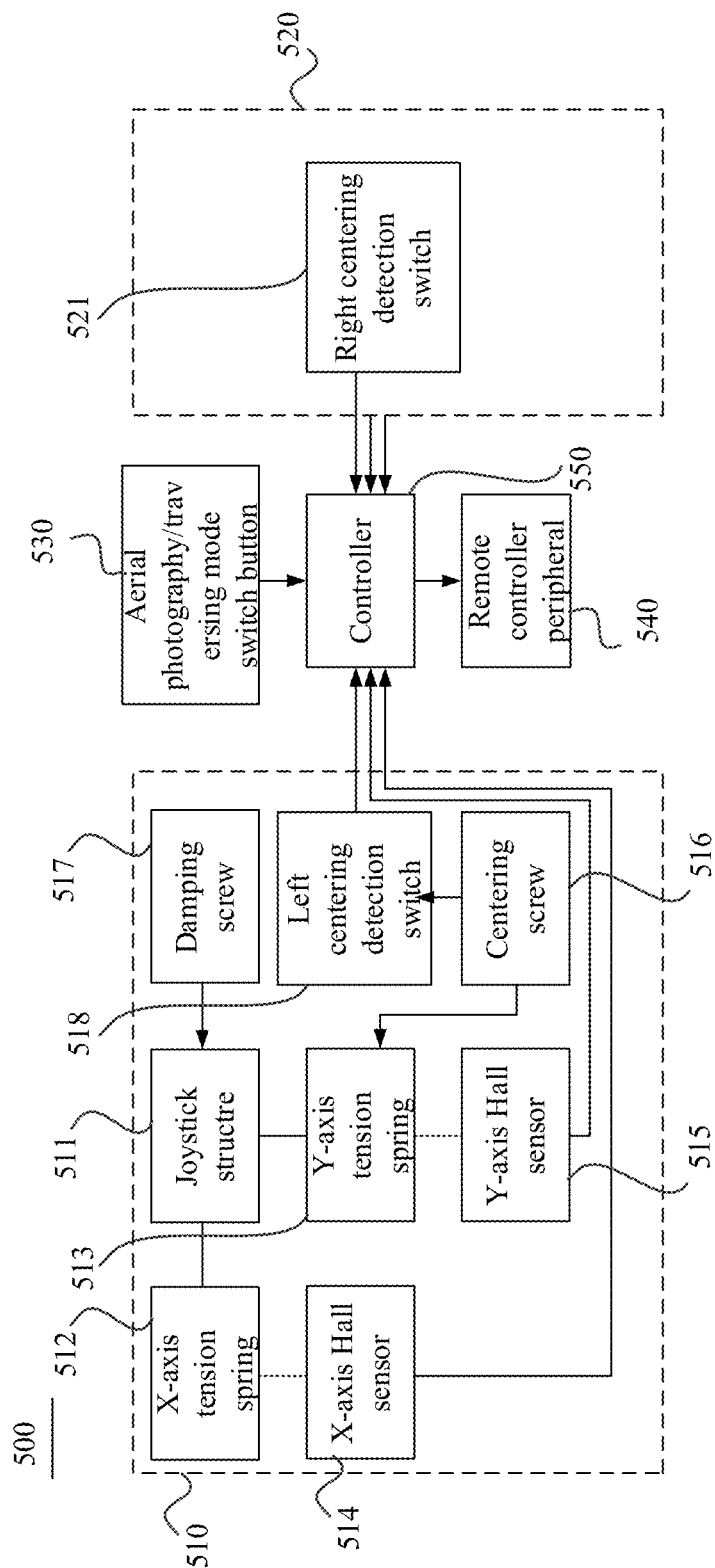
FIG. 5 is a schematic block diagram of a control terminal consistent with an embodiment of the present disclosure.

For example, as shown in FIG. 3 to FIG. 5, the remote controller 500 includes a left joystick assembly 510, a right joystick assembly 520, an aerial photography mode/traversing mode switch button 530, a remote controller peripheral 540, and a controller (MCU) 550, which are connected to each other as shown in FIG. 5. The remote controller peripheral 540 can include but is not limited to a screen, a speaker, and an LED light. The aerial photography mode/traversing mode switch button can also be connected to the controller 550. The controller can be connected to the remote controller peripheral 540, e.g., the screen, the speaker, and the LED light.

In some embodiments, the left joystick assembly 510 includes a joystick structure (with an XY-axis magnet) 511, an X-axis tension spring 512, a Y-axis tension spring 513, an X-axis Hall sensor 514, a Y-axis Hall sensor 515, a centering screw 516, a damping screw 517, a left centering detection switch 518, etc.

In some embodiments, the structure of the right joystick assembly 520 can be the same as the structure of the left joystick assembly 510. The right joystick assembly 520 and the left joystick assembly 510 can be centrally and symmetrically arranged. For example, a connection mode of the right centering detection switch 521 of the right joystick assembly 520 can be consistent with a connection mode of the left centering detection switch 518. The joystick structure can have various structures. The joystick can include but is not limited to a tension spring. For example, the joystick can also include a torsion spring. Angle sensors of the X-axis and Y-axis may not be limited to linear Hall sensors. For example, the angle sensors of the X-axis and Y-axis can include a potentiometer, a 3D Hall sensor, etc.

In some embodiments, the joystick structure 511 can include a joystick. A magnet can be arranged at a lower side of the joystick and configured to generate a stable magnetic field. The joystick can be fixed in the X-axis direction through an X-axis tension spring 512 and can be fixed in the Y-axis direction through a Y-axis tension spring 513. The joystick assembly can be provided with linear Hall sensors in the X-axis direction and the Y-axis direction, respectively. The linear Hall sensors can be configured to measure the rotation angles of the joystick in the two axis directions. An X-axis Hall sensor 514 and a Y-axis Hall sensor 515 can communicate with the controller 550. For example, when the joystick rotates in the X-axis direction, the joystick can drive an X-axis magnet to rotate. An X-axis magnetic field can change, which can be detected by the X-axis Hall sensor 514. The X-axis Hall sensor 514 can transfer the information to the controller 550 to cause the controller 550 to obtain rotation angles of the joystick in the two axis directions in real-time. The same for the Y-axis.

In some embodiments, the control terminal can include a centering device. The user can adjust the status of the centering device to enable the operation member to automatically return to the first initial position or to prevent the operation member from automatically returning to the first initial position. For example, the centering device includes a centering screw 516 as shown in FIG. 3 to FIG. 5. The left joystick assembly 510 further includes the centering screw 516, which can also be referred to as a mode-switch centering screw. The centering screw, when locked, can prevent the joystick from centering.

In some embodiments, the centering screw 516 can be connected to the Y-axis tension spring 513. When the user adjusts and tightens the centering screw 516, the Y-axis tension spring 513 can be locked, and the joystick cannot return to the middle position in the Y-axis direction. For example, the joystick cannot automatically return to the middle position in the Y-axis direction. For example, the position adjustment of the joystick in the Y-axis direction can be triggered by the user and cannot be performed autonomously. For example, when the user moves the joystick to a position in the Y-axis direction, the joystick can stay at the position in the Y-axis direction without moving until the user moves the joystick to another position.

In some embodiments, the remote controller can support "American Mode," "Japanese Mode," or "Chinese Mode." If the user control the UAV using the American mode, to adjust the remote controller to enter the traversing mode, the user can lock the centering screw 516 of the left joystick assembly 510 to lock the Y-axis tension spring 513. Thus, the joystick can no longer return to the middle position in the Y-axis direction. If the user controls the UAV in the Japanese mode or Chinese mode, to adjust the remote controller to enter the traversing mode, the user can lock the centering screw of the right joystick assembly 520 to lock the Y-axis tension spring. Thus, the right joystick can no longer return to the middle position in the Y-axis direction.

In some embodiments, as shown in FIG. 3 to FIG. 5, the left joystick assembly 510 further includes a damping screw 517. In some embodiments, the damping screw 517 can adjust the damping of the joystick in the non-centering status in the Y-axis direction. Thus, the remote controller can satisfy a user hand feeling requirement in the traversing mode.

Figure 6:
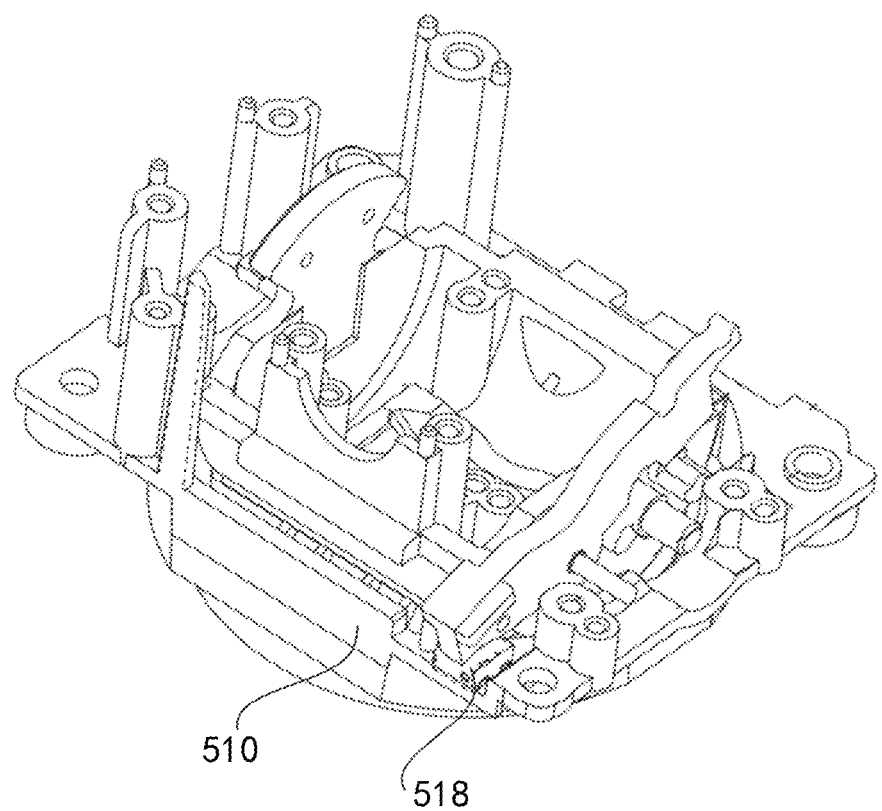
FIG. 6 is a schematic structural diagram of a detection device of a control terminal consistent with an embodiment of the present disclosure.

In some embodiments, the detection device of the control terminal can detect the status of the centering device and determine whether the operation member is in the centering status or the non-centering status according to the status of the centering device. In some embodiments, as shown in FIG. 5 and FIG. 6, the detection device includes a left centering detection switch 518 and/or a right centering detection switch 521 of the remote controller. Whether the operation member, for example, the joystick, is in the centering status or the non-centering status can be determined according to an on/off status of the centering device switch.

In some embodiments, when the user locks the centering screw 516 to set the joystick in the non-centering status, the joystick structure 511 can contact the left centering detection switch 518. For example, by the locking of the centering screw 516, a part of the joystick structure 511 can move toward the left centering detection switch 518 to trigger the change of the on/off status of the left centering detection switch 518. Thus, the controller 550 can detect that the left centering detection switch 518 is pressed down and determine that the joystick is in the non-centering status. The centering detection switch can include, for example, a micro-motion switch.

In some embodiments, the centering screw 516 can be connected to the Y-axis tension spring 513 and the left centering detection switch 518. When the user adjusts and tightens the centering screw 516, the Y-axis tension spring 513 can be locked. The joystick can no longer return to the middle position in the Y-axis direction. Meanwhile, tightening the centering screw 516 can trigger the left centering detection switch 518. An upper switch signal of the left centering detection switch 518 can trigger the controller 550 to notify the controller 550 that the joystick is in the non-centering status. The controller can perform subsequent logic control, e.g., in response to the mode switch operation of the user, switching to the first control mode or the second control mode. In some embodiments, the detection device of the control terminal cannot be limited to a centering detection switch having a switch button, e.g., a photoelectric switch, a Hall switch.

In some embodiments, the control member of the control terminal can include an aerial photography mode/traversing mode switch button 530. The controller 550 can set the control mode to the first control mode or the second control mode in response to the trigger operation of the user for the aerial photography mode/traversing mode switch button 530. The aerial photography mode/traversing mode switch button 530 is not limited to a three-speed boat switch, any button, a switch, or a virtual button on the screen.

Figure 7:
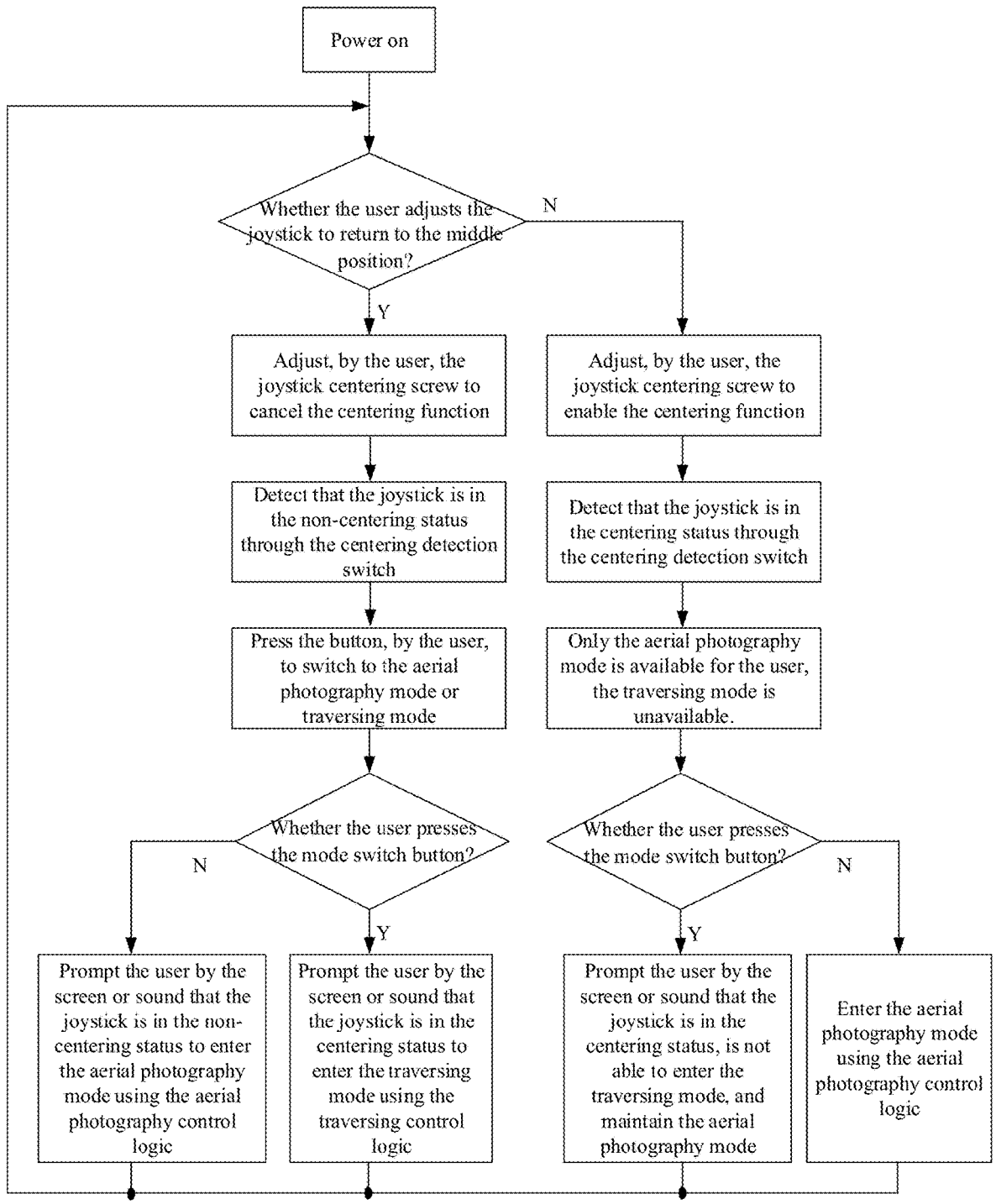
FIG. 7 is a schematic flowchart of a control method consistent with an embodiment of the present disclosure.

In some embodiments, FIG. 7 is a schematic flowchart of a control method consistent with an embodiment of the present disclosure.

After powering on, whether the user adjusts the joystick centering function (i.e., whether the joystick can return to the middle position) can be determined through the centering detection switch. If the joystick can return to the middle position, no matter whether the user presses down the aerial photography/traversing mode switch button, the UAV can only be in the aerial photography mode. If the joystick can return to the middle position, when the user presses the switch button to try to switch to the traversing mode, the user can be prompted through the screen or a sound that the joystick is in the centering status, and the UAV cannot enter the traversing mode. Thus, the UAV can stay in the aerial photography mode.

If the joystick does not return to the middle position, when the user presses the aerial photography/traversing mode switch button, the remote controller can be switched from the traversing mode to the aerial photography mode. Thus, the user can be prompted through the screen or sound that the joystick of the remote controller is in the non-centering status. The system can enter the aerial photography mode, and the aerial photography control logic can be used. If the joystick does not return to the middle position, when the user presses the aerial photography/traversing mode switch button, the remote controller can be switched to the traversing mode from the aerial photography mode. The user can be prompted through the screen or sound that the joystick is in the non-centering status. The system can enter the traversing mode, and the traversing control logic can be used. The aerial photography control logic can include that the operation member, e.g., the joystick, is configured to control the moving speed and/or the attitude angle of the UAV. The traversing control logic can include that the operation member, e.g., the joystick, is configured to control the acceleration and/or the angular speed of the attitude adjustment of the UAV.

In some embodiments, by adjusting the centering screw, the Y-axis of the remote controller can be adjusted to be in the non-centering status. Meanwhile, the centering screw can trigger the centering detection switch. The controller can obtain the rotation angle, the centering status, and the mode switch status of the X and Y axes of the joystick in real-time and provide a set of closed-loop detection control logic to reliably switch between the aerial photography mode and the traversing mode. According to whether the closed loop detection joystick can return to the middle position and whether the mode switch button is pressed down, the remote controller can enter different control modes. The corresponding remote controller peripheral can perform different user reminder operations.

In some embodiments, the control mode of the UAV can include but is not limited to the first control mode, the second control mode, and a third control mode. Thus, the UAV can have more control modes, which enriches user interest and experience.

In some embodiments, the method can further include switching to the third control mode in response to the use mode switch operation when the operation member is in the non-centering status. In the third control mode, if the amplitude of the position adjustment of the operation member is less than or equal to the amplitude threshold, the control mode can be switched to the first control mode. If the amplitude of the position adjustment of the operation member is greater than the amplitude threshold, the control mode can be switched to the second control mode.

In some embodiments, the third control mode may also be referred to as a semi-autonomous stable mode. The amplitude of the position adjustment of the operation member is less than or equal to the present amplitude. For example, when the joystick of the remote controller is within a certain angle, the control mode can be the first control mode, that is, self-stable control mode. When the adjustment of the position adjustment of the operation member is greater than the preset amplitude, e.g., when the joystick exceeds a certain angle, the control mode can be the second control mode, i.e., the manual control mode. Thus, the traversing UAV can be caused to flip over 90°. When the control mode is the third control mode, operation control difficulty can be reduced, and the exciting feeling of the flight can be increased.

In some embodiments, the control mode of the UAV can further include a UAV-searching beep mode. In the UAV-searching beep mode, the motor of the UAV can emit a beep of a certain frequency, which facilitates the user to find the UAV when the UAV collides with or falls on the ground.

In some embodiments, the control mode of the UAV can also include an anti-turtle mode. When the UAV collides or falls causing the UAV to be upside down on the ground, the control mode can be switched to the anti-turtle mode, in which the UAV can roll to the horizontal status according to the position adjustment of any or preset operation member of the control terminal to continue to fly.

The control method of the UAV of embodiments of the present disclosure can include switching to the first control mode or the second control mode in response to the mode switch operation of the user and adjusting the position or attitude of the UAV in the control direction corresponding to the operation member in response to the position adjustment of the operation member of the control terminal. In the first control mode, if the operation member is in the preset first initial position, the UAV can be controlled to maintain the position or attitude unchanged in the control direction. In the second control mode, if the UAV is in the initial status in the control direction, and the operation member is in the preset second initial position, the UAV can be controlled to maintain the position or attitude unchanged in the control direction corresponding to the operation member. The second initial position of the operation member can be different from the first initial position. At least in the second control mode, the operation member cannot return to the first initial position. Thus, the safety risks can be eliminated to improve flight safety and enhance flight reliability.

Figure 8:
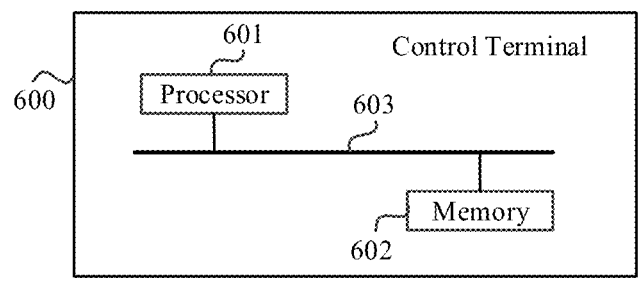
FIG. 8 is a schematic block diagram of a control terminal consistent with an embodiment of the present disclosure.

FIG. 8 is a schematic block diagram of a control terminal 600 consistent with an embodiment of the present disclosure.

The control terminal 600 can include at least one of a remote controller, a cell phone, a tablet computer, a notebook computer, a desktop computer, or a wearable device. The control terminal 600 can be communicatively connected to the UAV.

The control terminal 600 includes one or more processors 601. The one or more processors 601 can operate individually or together and can be configured to execute the control method of the UAV.

In some embodiments, the control terminal 600 further includes a memory 602.

In some embodiments, the processor 601 and the memory 602 are connected through a bus 603. The bus 603 can include, for example, an inter-integrated circuit (I2C) bus.

In some embodiments, the processor 601 can include a micro-controller unit (MCU), a central processing unit (CPU), or a digital signal processor (DSP).

In some embodiments, the memory 602 may be a Flash chip, a read-only memory (ROM), a magnetic disk, an optical disk, a U disk, or a mobile hard disk.

The processor 601 can be configured to run the computer program stored in the memory 602 and implement the control method of the UAV when the computer program is executed.

In some embodiments, the processor 601 can be configured to run a computer program stored in the memory 602. When the computer program is executed, the processor 601 can be configured to switch to the first control mode or the second control mode in response to the user mode switch operation and adjust the position or attitude of the UAV in the control direction corresponding to the control member.

In the first control mode, if the operation member is in the preset first initial position, the UAV can be controlled to maintain the position or attitude unchanged in the control direction. In the second control mode, if the UAV is in the initial status in the control direction, and the operation member is in the preset second initial position, the UAV can be controlled to maintain the position or attitude unchanged in the control direction corresponding to the operation member. The second initial position of the operation member can be different from the first initial position.

At least in the second control mode, the operation member can be in the non-centering status. In the non-centering status, the operation member cannot return to the first initial position automatically.

The specific principles and implementation of the control terminal of embodiments of the present disclosure are similar to the control method of the UAV of embodiments of the present disclosure, which is not repeated here.

Embodiments of the present disclosure further provide a computer-readable storage medium. The computer-readable storage medium can store a computer program that, when the computer program is executed by a processor, causes the processor to implement the control method of the UAV of embodiments of the present disclosure.

The computer-readable storage medium can be an internal storage unit of the control terminal of embodiments of the present disclosure, e.g., a hard disk or a memory of the control terminal. The computer-readable storage medium can also include an external storage apparatus of the control terminal, such as a plug-in hard drive equipped at the control terminal, a smart memory card (SMC), a secure digital (SD) card, a flash card, etc.

In some embodiments, the control method of the UAV of embodiments of the present disclosure can also be used in the UAV and/or the control device of the UAV and can be used to interact with the control terminal to perform a preset task, e.g., a process of adjusting the position and/or posture. In some embodiments, the control terminal can be configured to prompt the user with information of the mode switch operation and prompt the user with information of the position adjustment of the operation member of the control terminal. The control terminal can be further configured to indicate at least one of the information that the operation member is in the centering status or the non-centering status, status information of the detection device of the control terminal, or the joystick amount corresponding to the position of the operation member. The of the information that the operation member is in the centering status or the non-centering status, the status information of the detection device of the control terminal, or the joystick amount corresponding to the position of the operation member can be transferred to the UAV and/or the control device of the UAV through the upper information channel. The UAV and/or the control device of the UAV can be configured to perform the preset task according to the information sent by the control terminal.

The specific principle and implementation of the control method of the UAV can be similar to the control method of the UAV applied to the control terminal, which is not repeated here.

Figure 9:
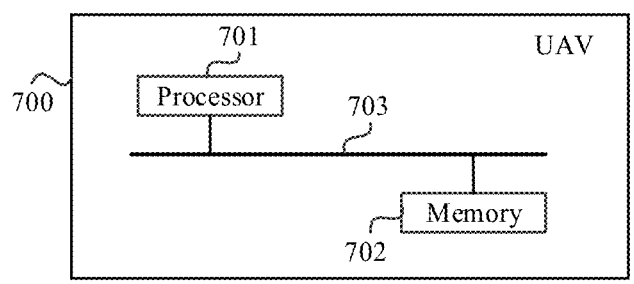
FIG. 9 is a schematic block diagram of a UAV consistent with an embodiment of the present disclosure.

FIG. 9 is a schematic block diagram of a UAV 700 consistent with an embodiment of the present disclosure. In some embodiments, the UAV can be a rotor UAV, such as a quad-rotor UAV, a hexa-rotor UAV, an octa-rotor UAV, or a fixed-wing UAV. In some embodiments, the UAV 700 can be used as an aerial photography UAV and a traversing UAV, for example, it can be called an experience UAV.

The UAV 700 includes one or more processors 701. The one or more processors 701 can operate individually or together to execute the control method of the UAV.

In some embodiments, UAV 700 also includes one or more memories 702.

In some embodiments, the processor 701 and the memory 702 are connected through a bus 703. The bus 703 can be, for example, an inter-integrated circuit (I2C) bus.

In some embodiments, the processor 701 can include a micro-controller unit (MCU), a central processing unit (CPU), or a digital signal processor (DSP).

In some embodiments, the memory 702 can include a flash chip, a read-only memory (ROM) magnetic disk, an optical disk, a U drive, or a mobile hard drive.

The one or more processors 701 can be configured to execute the computer program stored in the one or more memories 702. When the computer program is executed, the processor can be configured to perform the control method of the UAV.

In some embodiments, the one or more processors 701 can be configured to execute the computer program stored in the one or more memories 702. When the computer program is executed, the one or more processors can be caused to, in response to the mode switch operation of the user, switch to the first control mode or the second control mode, and, in response to the position adjustment of the operation member of the control terminal, adjust the position or attitude of the UAV in the control direction corresponding to the operation member.

In the first control mode, if the operation member is in the preset first initial position, the UAV can be controlled to maintain the position or attitude unchanged in the control direction. In the second control mode, if the UAV is in the initial status in the control direction, and the operation member is in the preset second initial position, the UAV can be controlled to maintain the position or attitude unchanged in the control direction corresponding to the operation member. The second initial position of the operation member can be different from the first initial position.

At least in the second control mode, the operation member can be in the non-centering status. In the non-centering status, the operation member cannot return to the first initial position automatically.

The specific principles and embodiments of the UAV of embodiments of the present disclosure can be similar to the control method of the UAV of embodiments of the present disclosure, which are not repeated here.

Embodiments of the present disclosure further provide a computer-readable storage medium. The computer program can be stored in the computer-readable storage medium. The computer program can include program instructions. When the computer program is executed by the processor, the processor can be caused to perform the control method of the UAV of embodiments of the present disclosure.

The computer-readable storage medium can be an internal storage unit of the UAV of embodiments of the present disclosure, e.g., a hard drive or a memory of the UAV. The computer-readable storage medium can also be an external storage apparatus of the UAV, e.g., a plug-in hard drive arranged at the UAV, a smart media card (SMC), a secure digital (SD) card, or a flash card.

Figure 10:
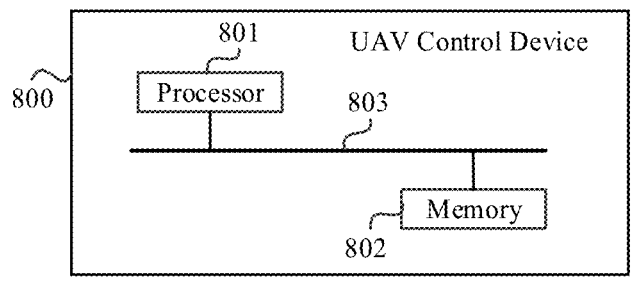
FIG. 10 is a schematic block diagram of a control device of a UAV consistent with an embodiment of the present disclosure.

FIG. 10 is a schematic block diagram of a control device 800 of a UAV consistent with an embodiment of the present disclosure. In some embodiments, the UAV may include a rotor UAV, such as a quad-rotor UAV, a hexa-rotor UAV, an octa-rotor UAV, or a fixed-wing UAV. The control device 800 can include, for example, a flight control assembly of the UAV.

The control device 800 includes one or more processors 801. The one or more processors 801 can operate individually or together to execute the control method of the UAV.

In some embodiments, the control device 800 further includes one or more memories 802.

In some embodiments, the one or more processors 801 and the one or more memories 802 are connected through one or more buses 803. The bus 803 can be, for example, an inter-integrated circuit (I2C) bus.

In some embodiments, the processor 801 can include a micro-controller unit (MCU), a central processing unit (CPU), or a digital signal processor (DSP).

In some embodiments, the memory 802 can include a flash chip, a read-only memory (ROM) magnetic disk, an optical disk, a U drive, or a mobile hard drive.

The one or more processors 801 can be configured to execute the computer program stored in the one or more memories 802. When the computer program is executed, the processor can be configured to perform the control method of the UAV.

In some embodiments, the one or more processors 801 can be configured to execute the computer program stored in the one or more memories 802. When the computer program is executed, the processor can be caused to, in response to the mode switch operation of the user, switch to the first control mode or the second control mode, and, in response to the position adjustment of the operation member of the control terminal, adjust the position or attitude of the UAV in the control direction corresponding to the operation member.

In the first control mode, if the operation member is in the preset first initial position, the UAV can be controlled to maintain the position or attitude unchanged in the control direction. In the second control mode, if the UAV is in the initial status in the control direction, and the operation member is in the preset second initial position, the UAV can be controlled to maintain the position or attitude unchanged in the control direction corresponding to the operation member. The second initial position of the operation member can be different from the first initial position.

At least in the second control mode, the operation member can be in the non-centering status. In the non-centering status, the operation member cannot return to the first initial position automatically.

The specific principles and embodiments of the UAV of embodiments of the present disclosure can be similar to the control method of the UAV of embodiments of the present disclosure, which are not repeated here.

Embodiments of the present disclosure further provide a computer-readable storage medium. The computer program can be stored in the computer-readable storage medium. The computer program can include program instructions. When the computer program is executed by the processor, the processor can be caused to perform the control method of the UAV of embodiments of the present disclosure.

The computer-readable storage medium can be an internal storage unit of the UAV of embodiments of the present disclosure, e.g., a hard drive or a memory of the UAV. The computer-readable storage medium can also be an external storage apparatus of the UAV, e.g., a plug-in hard drive arranged at the UAV, a smart media card (SMC), a secure digital (SD) card, or a flash card.

The terminology used in the present disclosure is used to describe embodiments of the present disclosure only and is not intended to limit the present disclosure.

The term "and/or" used in the present disclosure and the appended claims refers to and includes one or more combinations and all combinations of listed items.

Although embodiments of the present disclosure are described and shown, the scope of the present disclosure is not limited to this. Those of ordinary skill in the art can easily think of various equivalent modifications or replacements in the scope of the present disclosure. These modifications and replacements should be within the scope of the present disclosure. The scope of the present invention is defined by the claims and equivalents of the claims.

What is claimed is:

1. A control method comprising:
in response to a mode switch operation of a user, switching to a first control mode or a second control mode;
in response to a position adjustment of an operation member of a control terminal, adjusting a position or an attitude of an aerial vehicle in a control direction corresponding to the operation member;
in the first control mode, in response to the operation member being at a preset first initial position, controlling the aerial vehicle to maintain the position or the attitude unchanged in the control direction; and
in the second control mode, in response to the aerial vehicle being in an initial status in the control direction and the operation member being in a preset second initial position different from the first initial position, controlling the aerial vehicle to maintain the position or the attitude unchanged in the control direction;
wherein in the second control mode, the operation member is in a non-centering status and is not able to return to the first initial position automatically, and
wherein in response to the mode switch operation of the user, the switching to the first control mode or the second control mode includes, in response to the operation member being in the non-centering status and the mode switch operation of the user, switching to the first control mode or the second control mode.

2. The method according to claim 1, wherein the control direction includes at least one of an up-down direction, a front-rear direction, a left-right direction, a yaw direction, a roll direction, or a pitch direction.

3. The method according to claim 2, wherein in the first control mode, adjusting the position or the attitude of the aerial vehicle in the control direction corresponding to the operation member includes:
adjusting a target moving speed of the aerial vehicle in the up-down direction, the front-rear direction, or the left-right direction; or
adjusting a target attitude angle of the aerial vehicle in the yaw direction, the roll direction, or the pitch direction.

4. The method according to claim 3, wherein:
the target moving speed is smaller than or equal to a preset upper speed limit; and/or
the target attitude angle is smaller than or equal to a preset upper angle limit.

5. The method according to claim 2, wherein in the second control mode, adjusting the position or the attitude of the aerial vehicle in the control direction corresponding to the operation member includes:
adjusting a target moving speed of the aerial vehicle in the up-down direction, the front-rear direction, or the left-right direction; or
adjusting a target attitude angle of the aerial vehicle in the yaw direction, the roll direction, or the pitch direction.

6. The method according to claim 2, further comprising:
determining the control direction corresponding to the operation member according to a current control mode of the control terminal.

7. The method according to claim 1, wherein controlling the aerial vehicle to maintain the position or the attitude unchanged in the control direction includes:
determining that a target moving speed or a target attitude angle of the aerial vehicle is zero in the control direction; or
determining that a target acceleration or a target angular speed of the aerial vehicle in the control direction is zero.

8. The method according to claim 1, wherein:
in the first control mode, controlling the aerial vehicle to maintain the position or the attitude unchanged in the control direction includes controlling the aerial vehicle according to sensor data of a sensor carried by the aerial vehicle to maintain the position or the attitude of the aerial vehicle unchanged in the control direction.

9. The method according to claim 8, wherein:
in the first control mode, controlling the aerial vehicle to maintain the position or the attitude unchanged in the control direction includes controlling the aerial vehicle according to the sensor data to remain in a horizontal attitude.

10. The method according to claim 1, wherein the initial status in the control direction includes a landed status.

11. The method according to claim 10, further comprising:
in response to the aerial vehicle being in a flight status and the operation member being in the preset second initial position, controlling a descending speed of the aerial vehicle not to be greater than a descending threshold.

12. The method according to claim 1, further comprising:
determining whether the operation member is in a centering status or the non-centering status through a detection device of the control terminal;
wherein, in response to the operation member being in the centering status, the operation member automatically returns to the first initial position without an operation of the user.

13. The method according to claim 12, further comprising:
in response to the operation member being in the centering status, switching to the first control mode.

14. The method according to claim 13, further comprising:
in response to the operation member being in the centering status and obtaining the mode switch operation of the user, outputting prompt information to prompt that the operation member is in the centering status and/or not able to switch to the second control mode.

15. The method according to claim 1, further comprising, in response to the operation member being in the non-centering status:
outputting first prompt information to prompt that the operation member is in the non-centering status; and/or
outputting second prompt information to prompt that a current mode is the first control mode or the second control mode.

16. The method according to claim 1, further comprising:
in response to the operation member being in the non-centering status and the mode switch operation of the user, switching to a third control mode;
wherein in the third control mode:
in response to an amplitude of the position adjustment of the operation member being smaller than or equal to an amplitude threshold, switching to the first control mode; and
in response to the amplitude of the position adjustment of the operation member being greater than the amplitude threshold, switching to the second control mode.

17. The method according to claim 1, wherein:
the first initial position is located in a middle of a movement stroke of the operation member; and
the second initial position of the operation member is located on a side of the movement stroke of the operation member.

18. A control terminal comprising:
one or more processors; and
one or more memories storing instructions that, when executed by the one or more processors, cause the one or more processors to:
in response to a mode switch operation of a user, switch to a first control mode or a second control mode; and
in response to a position adjustment of an operation member of a control terminal, adjust a position or attitude of an aerial vehicle in a control direction corresponding to the operation member;
in the first control mode, in response to the operation member being at a preset first initial position, controlling the aerial vehicle to maintain the position or the attitude unchanged in the control direction; and
in the second control mode, in response to the aerial vehicle being in an initial status in the control direction and the operation member being in a preset second initial position different from the first initial position, controlling the aerial vehicle to maintain the position or the attitude unchanged in the control direction;
wherein in the second control mode, the operation member is in a non-centering status and is not able to return to the first initial position automatically, and
wherein in response to the mode switch operation of the user, the switching to the first control mode or the second control mode includes, in response to the operation member being in the non-centering status and the mode switch operation of the user, switching to the first control mode or the second control mode.

19. An aerial vehicle comprising:
a body;
a power system arranged at the body and configured to provide flight power to the aerial vehicle;
one or more processors; and
one or more memories storing instructions that, when executed by the one or more processors, cause the one or more processors to:
in response to a mode switch operation of a user, switch to a first control mode or a second control mode;
in response to a position adjustment of an operation member of a control terminal, adjust a position or an attitude of the aerial vehicle in a control direction corresponding to the operation member;
in the first control mode, in response to the operation member being at a preset first initial position, controlling the aerial vehicle to maintain the position or attitude unchanged in the control direction;
in the second control mode, in response to the aerial vehicle being in an initial status in the control direction and the operation member being in a preset second initial position different from the first initial position, controlling the aerial vehicle to maintain the position or the attitude unchanged in the control direction;
wherein in the second control mode, the operation member is in a non-centering status and is not able to return to the first initial position automatically, and
wherein in response to the mode switch operation of the user, the switching to the first control mode or the second control mode includes, in response to the operation member being in the non-centering status and the mode switch operation of the user, switching to the first control mode or the second control mode.

* * * * *